United States Patent
Yuan et al.

[11] Patent Number: 6,098,060
[45] Date of Patent: Aug. 1, 2000

[54] PROCESS CONTROLLING METHOD AND DEVICE

[75] Inventors: Hao Yuan, Erlangen; Andre Berghs, Neunkirchen, both of Germany

[73] Assignee: Siemens Aktiengesellschaft, Munich, Germany

[21] Appl. No.: 08/913,503

[22] PCT Filed: Mar. 16, 1995

[86] PCT No.: PCT/DE95/00366

§ 371 Date: Nov. 4, 1997

§ 102(e) Date: Nov. 4, 1997

[87] PCT Pub. No.: WO96/28770

PCT Pub. Date: Sep. 19, 1996

[51] Int. Cl.[7] .................................................. G06E 1/00
[52] U.S. Cl. ........................... 706/26; 706/23; 706/25; 706/21
[58] Field of Search ................................. 706/23, 25, 21

[56] References Cited

U.S. PATENT DOCUMENTS 5,249,954  10/1993  Allen et al. .............................. 431/14
5,282,131   1/1994  Rudd et al. ............................. 700/44

*Primary Examiner*—Eric W. Stamber
*Assistant Examiner*—Edward G. Brown
*Attorney, Agent, or Firm*—Kenyon & Kenyon

[57] ABSTRACT

For controlling a process, manipulated variables for a plurality of actuators that act on the process are calculated in a control device from measured values for output quantities of the process.

To optimize the control of the process by control device (7), the actuator efficiencies ($w_{11}, \ldots w_{nm}$) that describe the dependence of the changes in the output quantities ($dy_1, \ldots, dy_m$) on the changes in the manipulated variables ($du_1, \ldots, du_n$) for each actuator are learned in a neural network (10) and sent to the control device (7) to improve the calculation of the manipulated variables ($u_1, \ldots, u_n$)

16 Claims, 4 Drawing Sheets

PROCESS CONTROLLING METHOD AND DEVICE

FIELD OF THE INVENTION

The present invention relates to a method for controlling a process, wherein manipulated variables for a plurality of actuators that influence the process are calculated in a control device from measured output quantities of the process. The present invention also concerns a corresponding device.

BACKGROUND INFORMATION

In controlling processes, a plurality of actuators are often available to influence certain output quantities of the process. The manipulated variables for the individual actuators are calculated in a control device as a function of guide variables whose values should assume the output quantities of the process. An example of such a process control is the regulation of the flatness of the strip in a rolling system, wherein the roll gap and thus the flatness of the strip are influenced by the sweep, bending, axial displacement and/or zone cooling of the rolls as a function of measured values for the flatness of the strip distributed over the width of the rolled strip.

For good regulation of the output quantities of the process, it is extremely important for the controlling device to be supplied with information regarding the efficiencies of the actuators, i.e., information on how the individual actuators act on the output quantities. The problem here is that little or no information about the efficiencies of actuators is usually available in industrial systems.

It is generally known that in rolling metal strips, the flatness of the strip can be improved by simultaneous operation of a plurality of actuators that influence the roll gap.

It is also known from *Hitachi Review*, vol. 41, no. 1 (1992), pages 31–38, that for regulating the flatness of the strip in a roll stand, each actuator of the roll stand can be assigned a typical sample profile of strip flatness of which it is known on the basis of empirical information about the rolling process that it can be improved by actuation of the respective actuator. Downstream from the roll stand, the actual profile of strip flatness is measured, and the measured values thus obtained are sent to a neural network that indicates as a network response the proportion of the individual sample profiles in the measured profile of strip flatness is composed of the individual sample profiles. The resulting proportions are linked in fuzzy rules to form actuating signals for the actuators. The known process is based to a very great extent on the empirical knowledge of the roll producer regarding the effect of the actuators, but that is comparatively general and inaccurate for optimum process control. Furthermore, the empirical knowledge introduced is usually limited to the respective system and cannot be readily transferred to other systems.

SUMMARY OF THE INVENTION

An object of the present invention is to provide a process and a device for controlling a process that will permit optimum process control, regardless of the available empirical knowledge about the process.

The present invention is directed to a method for controlling a process, wherein manipulated variables for a plurality of actuators that act on the process are calculated in a control device from measured values of output quantities of the process. The actuator efficiencies that describe the dependence of the changes in output quantities on the changes in the manipulated variables for each actuator are learned in a neural network. The learned actuator efficiencies are supplied to the control device to improve the calculation of the manipulated variables.

With the process according to the present invention and the corresponding device, the efficiencies of the actuators are learned automatically for the individual actuators on the basis of changes in the manipulated variables measured during the process and the output quantities of the process with normal process management and are sent to the control device to improve the calculation of the manipulated variables. The efficiencies of precisely those actuators being controlled by the control device are always learned. So if the control device controls only a portion of the actuators, only the efficiencies of these actuators are learned. The other actuator efficiencies are learned when the respective actuators are used. With the actuator efficiencies thus learned, the control device is supported in its calculation of the manipulated variables without intervention in the control device itself. The process according to this invention can thus be used with existing systems, wherein the control devices present there are used in the accustomed manner.

The learning of the actuator efficiencies for the individual actuators takes place in a neural network as a function of changes in the manipulated variables performed by the control device during the normal process flow and as a function of the resulting changes in the output quantities. With an unchanged operating point of the process, the functional relationships between the changes in the output quantities of the process and the changes in the manipulated variables can be linearized in the low-level signal range, so the neural network can have only one input layer and one output layer and therefore has a simple design. In this neural network, the changes in manipulated variables $du_i$ sent to it at the input are linked to network responses $d\tilde{y}_j$ via network parameters $w_{ij}$ that correspond to the actuator efficiencies to be learned, according to the equation:

$$d\tilde{y}_j = \sum_{i=1}^{n} w_{ij} \cdot du_i$$

and the network parameters $w_{ij}$ are varied as a function of the deviations between the network responses and the changes in output quantities to reduce this deviation. The learning process, wherein the actuator efficiencies are learned in the neural network, can follow slow changes in the operating point of the process. In addition, the actuator efficiencies learned for an operating point are stored, in particular when there are rapid or large changes in the operating point; when the process has again reached the operating point for which the stored actuator efficiencies were learned, these actuator efficiencies are again sent to the neural network as network parameters.

To comprehensively take into account the dependence of the actuator efficiencies to be learned on the variable operating point of the process, a given number of operating interpolation points is established preferably in the operating range within which the operating point can vary, and the changes in manipulated variables sent to the input of the neural network for each operating interpolation point are weighted with a weighting factor that is a measure of the distance between the current operating point and the respective operating interpolation point. Then the changes in manipulated variables $o_a \cdot du_i$ weighted with the weighting factors $o_a$ in the neural network are linked to network responses $d\tilde{y}_j$ according to the equation:

$$d\tilde{y}_j = \sum_{a=1}^{s} \sum_{i=1}^{n} w_{aij} \cdot o_a \cdot du_i$$

wherein $w_{aij}$ denotes the adjustable network parameters of the neural network and $$\sum_{a=1}^{s} o_a \cdot w_{aij} = w_{ij}$$

denotes the actuator efficiencies to be learned. For adaptation of the neural network, the network parameters $w_{aij}$ are varied as a function of the deviations between the network responses and the changes in the output quantities of the process to reduce these deviations.

Since changes in manipulated variables sent as input parameters to the neural network may contain noise, they are preferably first sent to a filter that withholds changes in manipulated variables below a predetermined threshold from the neural network.

To achieve a better and more rapid convergence in learning the actuator efficiencies, a plurality of data sets of manipulated variables, network responses and output quantities are preferably used for each learning step at which the network parameters are altered.

DETAILED DESCRIPTION

Figure 1:
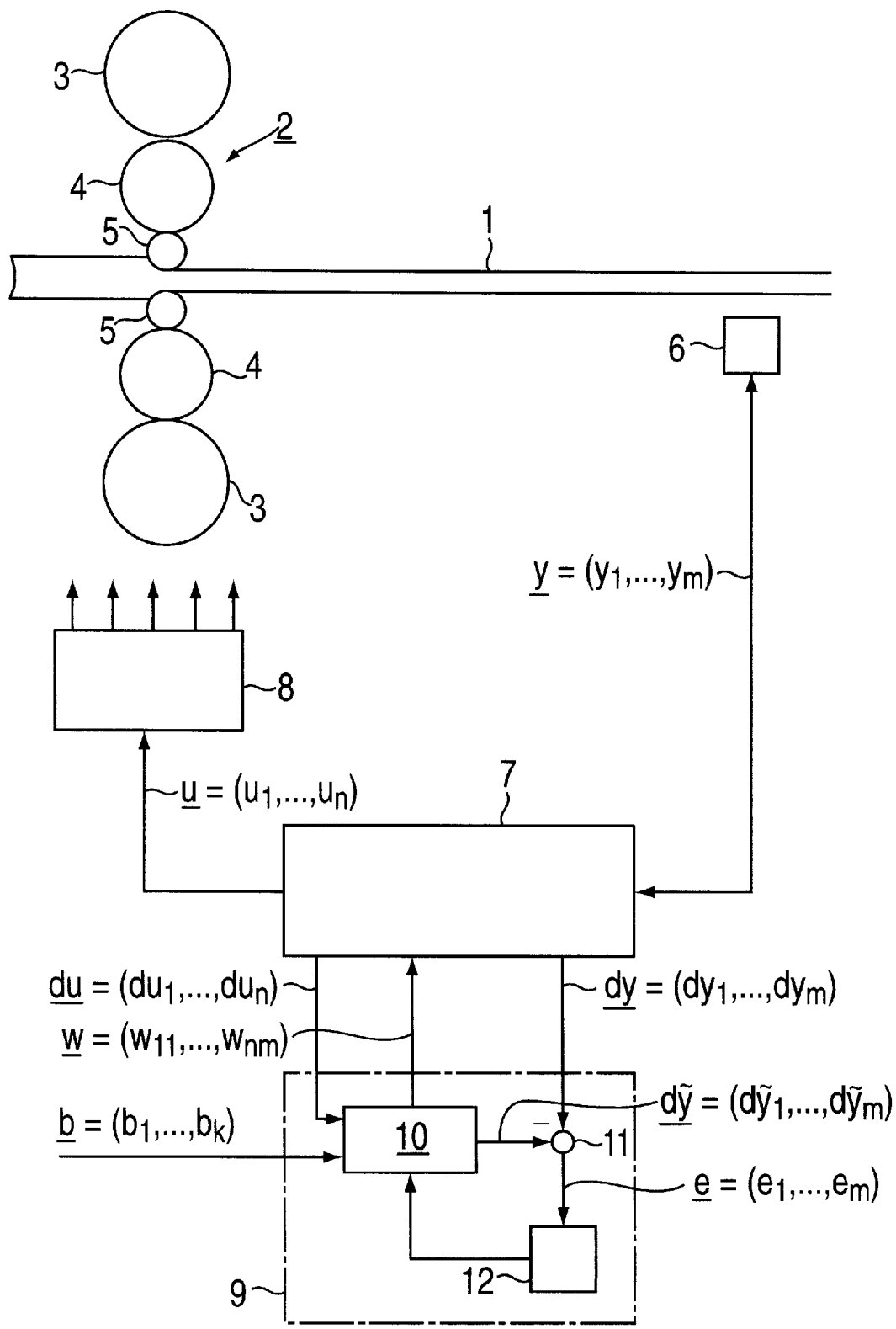
FIG. 1 shows an embodiment of a device according to the present invention with a control device for regulating the flatness of a strip in a rolling mill and with a neural network for learning the actuator efficiencies.

FIG. 1 shows an example of the device according to this invention which serves to control a process, in this case regulating the flatness of a strip 1 in a rolling mill. The rolling mill may have a plurality of roll stands; here the last roll stand 2 in the direction of travel of strip 1 is shown with backup rolls 3, intermediate rolls 4 and working rolls 5. Rolls 3, 4 and 5 together with known means, which are therefore not shown separately, for adjusting, pivoting, bending and displacing the rolls and for cooling certain rolling zones here form different actuators for influencing the flatness of the strip. Downstream from roll stand 2 there is a flatness measuring device 6 that continuously measures the current flatness of rolled strip 1 in the form of flatness characteristic quantities $y_1, \ldots, y_m$ distributed over the width of strip 1 and combined in a vector y. Flatness can be measured by measuring device 6, for example, by the fact that measuring rolls (not shown here) detect the distribution of strip stress over the width of strip 1. The flatness characteristics form the output quantities of the process which are sent to the input of a control device 7 which calculates manipulated variables $u_1, \ldots, u_n$ from m output quantities $y_1, \ldots, y_m$. The n actuators of roll stand 2 are controlled with these manipulated variables via a suitable control device 8 for influencing the flatness y of the strip.

To support and optimize the regulation of strip flatness y by control device 7, actuator efficiencies $W=(w_{11}, \ldots, w_{nm})$ which describe the changes in output quantities $dy=(dy_1, \ldots, dy_m)$ as a function of the changes in manipulated variables $du=(du_1, \ldots, du_n)$ are learned in a central processor during the ongoing process and sent to control device 7. Only the actuator efficiencies of those actuators that are controlled manually or via control device 7 are learned at each moment. Actuator efficiencies $w_{11}, \ldots, w_{nm}$ to be calculated depend on the current operating point of the rolling mill which is defined by operating point parameters $b=(b_1, \ldots b_k)$. These are influencing parameters that influence the process in addition to the manipulated variables $u_1, \ldots, u_n$. In the example illustrated here, these parameters are the strip width, the rolling force and the roll diameter.

Neural network 10 links the changes du in manipulated variables supplied to it at the input and optionally the operating parameters b to network responses $d\tilde{y}=(d\tilde{y}_1 \ldots, d\tilde{y}_m)$ which are compared with the changes in the measured output quantities dy in a comparator 11. By means of a learning algorithm 12, the network parameters of neural network 10 are altered as a function of the deviations $e=(e_1, \ldots, e_m)$ thus determined between the changes dy in output quantities and the network responses $d\tilde{y}$ to reduce these deviations e. The relationship between the network responses $d\tilde{y}$ and the changes du in manipulated variables thus learned in neural network 10 corresponds to the actuator efficiencies W to be learned and is sent to control device 7 to improve the calculation of manipulated variables u.

The functional relationships between the output quantities $y_j$, $j=1, \ldots, m$, and the manipulated variables $u_i$, $i=1, \ldots, n$, as well as the operating point parameters $b_l$, $l=1, \ldots, k$ can be described as follows:

$$y_j = f_j(u_1, \ldots, u_n, b_1, \ldots, b_k).$$

In the low-level signal range, these relationships can be linearized, so it holds that:

$$dy_j = \frac{\partial f_j}{\partial u_1} \cdot du_1 + \frac{\partial f_j}{\partial u_2} \cdot du_2 + \ldots + \frac{\partial f_j}{\partial u_n} \cdot du_n,$$

wherein $\partial f_j / \partial u_i = w_{ij}$ denote functions of the operating parameters $b_1, \ldots, b_k$. Written differently, this yields:

$$dy = W \cdot du,$$

wherein W is an m×n matrix whose coefficients $w_{ij}$ correspond to the actuator efficiencies.

Figure 2:
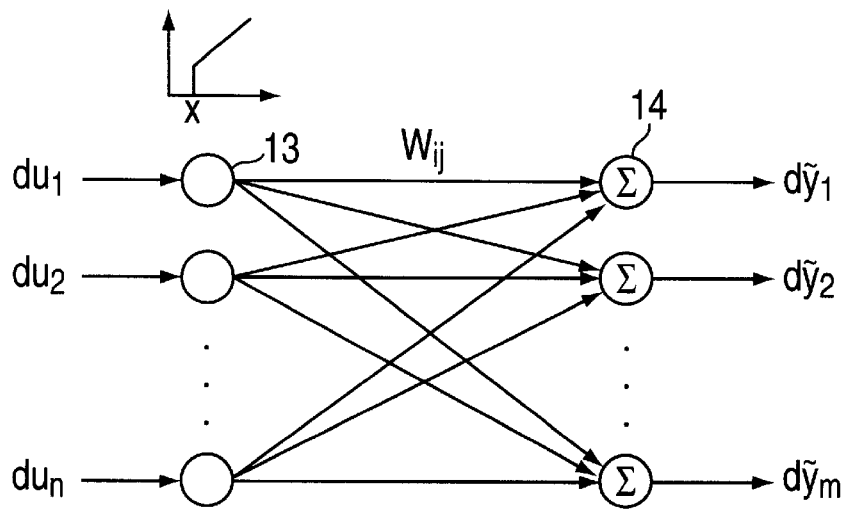
FIG. 2 shows an example of the neural network for learning the actuator efficiencies for an operating point of the process.

FIG. 2 shows an example of the neural network 10 from FIG. 1 for learning the actuator efficiencies $w_{ij}$ for a fixed operating point of the process. Since the operating point is invariable, the actuator efficiencies $w_{ij}$ to be learned are independent of the operating point parameters $b_1, \ldots, b_k$.

The neural network has an input layer with n input elements 13 for each of the changes $du_i$ in the manipulated variables. Input elements 13 function as filters that retain the changes $du_i$ in manipulated variables below a predefined threshold value x, e.g., 2% of the maximum setting range to filter out noise from the input quantities of the neural network. The neural network also has an output layer with m output elements 14 corresponding to the number of output quantities $y_j$ of the process. The filtered input quantities $du_i$ are weighted with a network parameter $w_{ij}$ for each output element 14 and then added up to the network responses:

$$d\tilde{y}_j = \sum_{i=1}^{n} w_{ij} \cdot du_i$$

Network parameters $w_{ij}$ thus correspond to the actuator efficiencies $w_{ij}$ to be learned.

Training of the neural network is performed according to the back-propagation algorithm, by searching for the minimum in the error function $E=0.5\ e_j^2=0.5\cdot(dy_j-d\tilde{y}_j)^2$ through descent in the direction of the gradient. To do so, as explained above with reference to FIG. 1, the network responses $dy_j$ are compared with the measured changes in output quantities $d\tilde{y}_j$, in comparator 11, with network parameters $w_{ij}$ being altered adaptively in the downstream learning algorithm 12 with the learning step width $\eta$ in the direction of a reduction in error E. The adaptation steps are derived as follows:

$$dw_{ij} = -\eta \frac{\partial E}{\partial w_{ij}} = \eta(dy_j - d\tilde{y}_j) \cdot du_i$$

To make the actuator efficiencies $w_{ij}$ accessible to control device 7, n vector samples $(0, \ldots, 0, 1, 0, \ldots, 0)$ each with different positions of the value "one" are sent as input quantities to input elements 13 of neural network 10, so the actuator efficiencies learned $w_{ij}$ appear as network responses at output elements 14 for transfer to control device 7.

Figure 3:
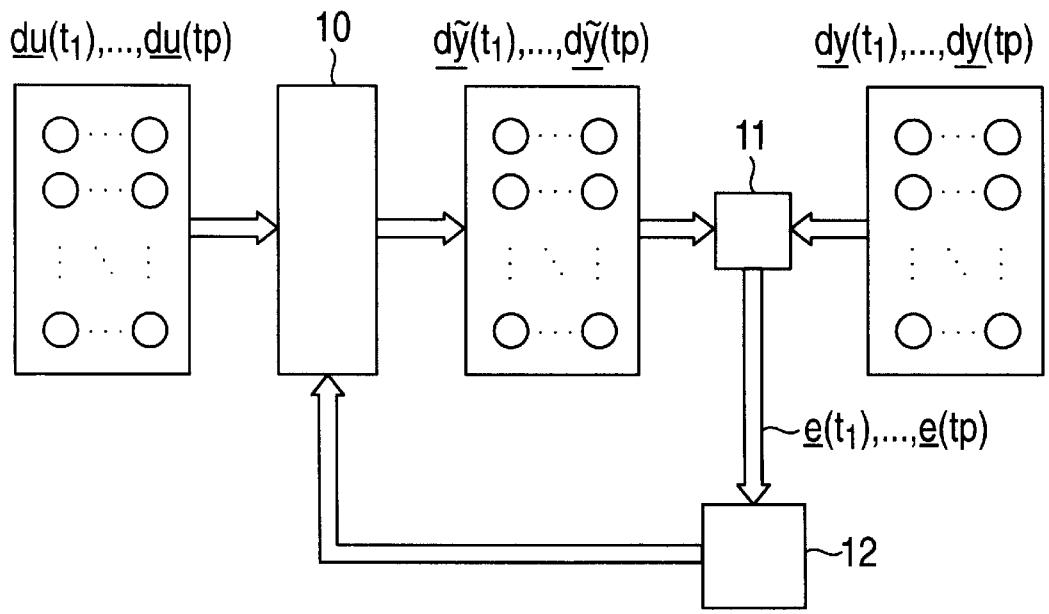
FIG. 3 represents an exemplary procedure for learning the actuator efficiencies using a plurality of data sets.

As explained below with reference to FIG. 3, a better and faster convergence can be achieved in learning actuator efficiencies $w_{ij}$ by using a plurality of data sets of manipulated variables $du(t_1), \ldots, du(t_p)$, network responses $d\tilde{y}(t_1), \ldots, d\tilde{y}(t_p)$, and changes in the process output quantities $dy(t_1), \ldots, dy(t_p)$ for each learning step at which network parameters $w_{ij}$ are altered. The adaptation steps are obtained as follows:

$$dw_{ij} = -\eta \frac{\partial E}{\partial w_{ij}} = \eta \cdot \sum_{r=1}^{p} (dy_j(t_r) - d\tilde{y}_j(t_r)) \cdot du_i(tr)$$

As mentioned above, actuator efficiencies $w_{ij}$ for a fixed operating point of the process can be learned with the neural network illustrated in FIG. 2. If this operating point changes slowly, the learning process can follow this change. If the changes in operating point are large or rapid, i.e., the changes in the above-mentioned operating point parameters $b_1, \ldots, b_k$ are large or rapid, the dependence of the actuator efficiencies $w_{ij}$ on the operating point parameters $b_1, \ldots, b_k$ must be taken into account in learning the actuator efficiencies $w_{ij}$.

Figure 4:
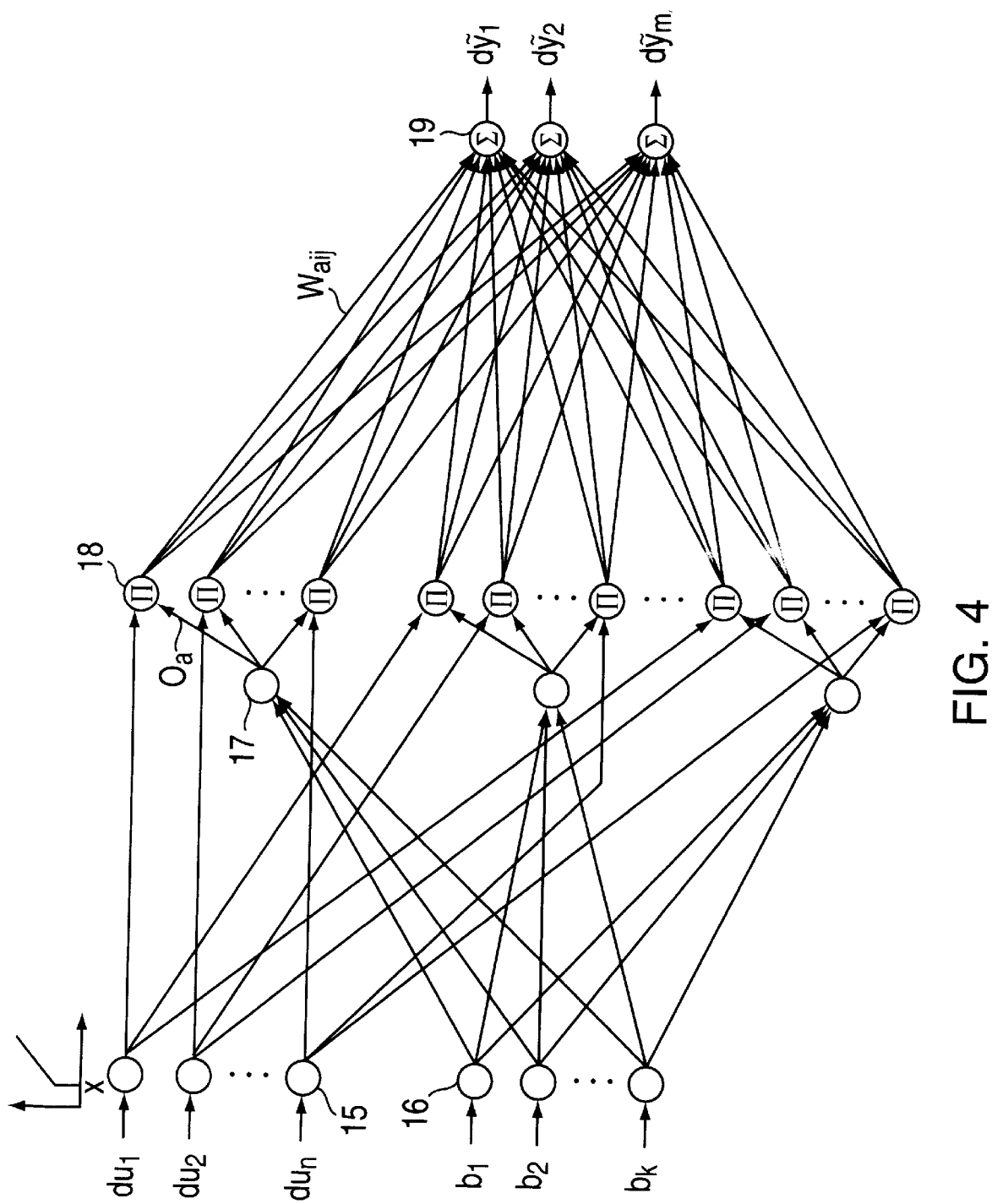
FIG. 4 shows another example of a neural network used for learning the actuator efficiencies for changing operating points.

FIG. 4 shows an example of neural network 10 that meets this requirement. The neural network has an input layer with n input elements 15 for each of the changes $du_i$ in manipulated variables and k additional input elements 16 for each of the operating point parameters $b_1$. Input elements 15 function as filters that retain changes in manipulated variables $du_i$ below a predetermined threshold value x, to filter out noise from the input parameters of the neural network.

Figure 5:
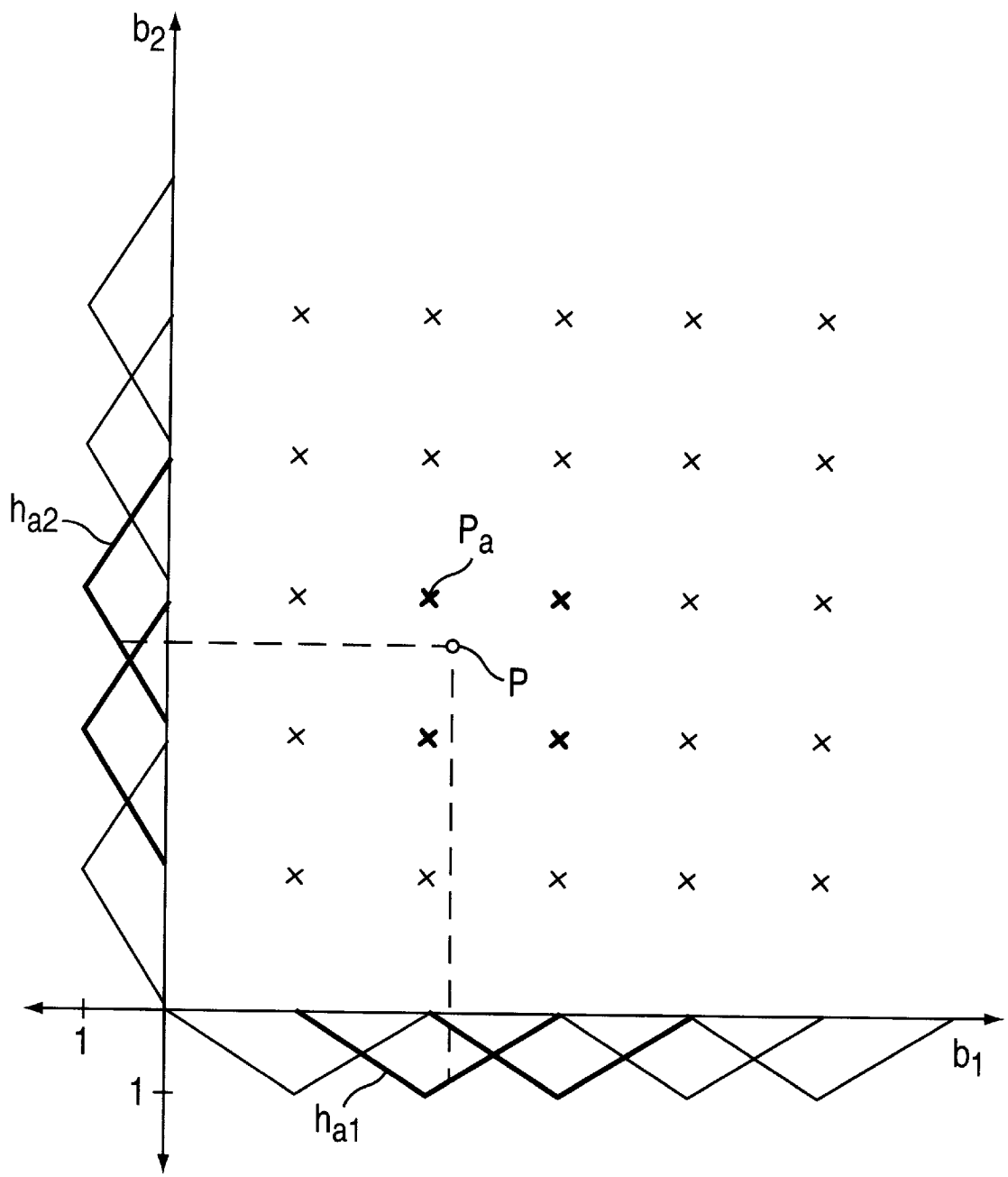
FIG. 5 is a diagram illustrating the determination of weighting factors in conjunction with learning the actuator efficiencies in the neural network according to FIG. 4.

Downstream from the input layer with input elements 15 and 16 there is a hidden layer with elements 17 and 18 whose function will be illustrated first with reference to FIG. 5. Operating point parameters $b_l$, $l=1, \ldots, k$, define a k-dimensional space that is illustrated in FIG. 5 for the case wherein k=2 for the sake of simplicity. In this k-dimensional space, a predefined number of operating interpolation points $P_a$, $a=1, \ldots, s$ are established. In the example illustrated here, the operating interpolation points $P_a$ are defined by q=5 different values of operating point parameters $b_l$, so that $s=q^k$ for the number s of operating interpolation points $P_a$. For each of the operating point parameters $b_l$ an allocation function $h_{a1}$ which has a value of "one" at the respective operating interpolation point $P_a$ and drops steadily to the value "zero" at the directly adjacent operating interpolation points is assigned to each operating interpolation point $P_a$.

As FIG. 5 shows, there are $2^k$ (i.e., 4 in this case) adjacent operating interpolation points $P_a$ for each current operating point P of the process, which are shown in bold here. The proximity of operating point P to its directly adjacent operating interpolation points $P_a$ is defined by the values of the respective allocation functions $h_{a1}$ at operating point P, which are linked to a weighting factor $o_a=f(h_{a1}, h_{a2})$, for example, for the operating interpolation point $P_a$ shown here. This weighting factor $o_a$, $0 \leq o_a \leq 1$, is thus a measure of the distance of operating point P from operating interpolation point $P_a$.

The hidden layer of the neural network illustrated in FIG. 4 has for each operating interpolation point $P_a$ an element 17 that calculates the weighting factor $o_a$ from the operating point parameters $b_l$ that are supplied to it and define the current operating point P. For each of the s operating interpolation points $P_a$ the filtered changes $du_i$ in the manipulated variables are weighted with weighting factors $o_a$ in a total of n·s elements 18.

The neural network also has an output layer with m output elements 19 corresponding to the number m of output quantities $y_j$ of the process. Each of the weighted changes $o_a \cdot du_i$ in the manipulated variables is weighted with a network parameter $w_{aij}$ for each output element 19 and then added up to form the network responses:

$$d\tilde{y}_j = \sum_{a=1}^{s} \sum_{i=1}^{n} w_{aij} \cdot o_a \cdot du_i$$

Adaptation of network parameters $w_{aij}$ to the actual course of the process takes place in the same way as described above for the example of the neural network in FIG. 2, but the deviations $e_j$ are weighted with weighting factors $o_a$ to yield $o_a \cdot e_j$.

For the actuator efficiencies $w_{ij}$ to be learned, it holds that:

$$\sum_{a=1}^{s} o_a \cdot w_{aij} = w_{ij}$$

As also shown in the example of the neural network in FIG. 2, they are made accessible for control device 7 in such a way that n vector patterns $(0, \ldots, 0, 1, 0, \ldots, 0)$ each one with different positions of the value "one" are supplied as input parameters to input elements 15 so that output elements 19 generate the actuator efficiencies learned $w_{ij}$ as network responses which are then transferred to control device 7.

In conjunction with the learning of the actuator efficiencies $w_{ij}$, a better and faster convergence is also achieved with the neural network illustrated in FIG. 4, using a plurality of data sets of manipulated variables $du(t_p)$, network responses $d\tilde{y}(t_1), \ldots, d\tilde{y}(t_p)$ and changes in output quantities $dy(t_1), \ldots, dy(t_p)$ of the process, as already illustrated with reference to FIG. 3.

What is claimed is:

1. A method for controlling a process upon which a plurality of actuators act, the method comprising the steps of:

calculating manipulated variables for the plurality of actuators, the manipulated variables being calculated in a control device from measured values of output quantities of the process;

learning, in a neural network, actuator efficiencies which describe a dependence of changes in the output quantities on changes in the manipulated variables for each actuator; and sending the learned actuator efficiencies to the control device to improve the calculation of the manipulated variables, wherein the neural network has at least two hidden layers, weights of one of the at least two hidden layers of the neural network modeling current operating point parameters.

2. The method of claim 1, wherein the operating point parameters include at least one of a rolled stock width, a rolling force and a diameter of at least one roll of a rolling mill.

3. The method of claim 1, wherein weights of at least a second one of the at least two hidden layers of the neural network are adapted using linear associators.

4. The method of claim 1, wherein changes $du_i$ in the manipulated variables are provided to the neural network, the neural network linking the changes $du_i$ to network responses $d\tilde{y}_j$ via network parameters $w_{ij}$, which correspond to the actuator efficiencies to be learned, according to the equation:

$$d\tilde{y}j = \sum_{i=1}^{n} w_{ij} \cdot du_i$$

and wherein the network parameters $w_{ij}$ are altered as a function of deviations between the network responses $d\tilde{y}_j$ and the changes in the output quantities so as to reduce the deviations.

5. The method of claim 4, wherein the network parameters are altered according to a back-propagation algorithm, in that a minimum error function $E=0.5 \cdot (dy_j - d\tilde{y}_j)^2$ is sought through descent in a direction of a gradient.

6. The method of claim 4, wherein the changes in the manipulated variables provided to the neural network are first passed through a filter that withholds from the neural network those changes in the manipulated variables that are below a predetermined threshold value.

7. The method of claim 4, wherein for each learning step at which the network parameters are altered, a plurality of data sets of the manipulated variables, network responses and output parameter changes are used.

8. The method of claim 1, comprising the steps of:

establishing a predetermined number of operating interpolation points with a dependence of the actuator efficiencies on operating point parameters of the process in a multidimensional space defined by the operating point parameters;

providing changes $du_i$ in the manipulated variables to the neural network for each operating interpolation point;

weighting each change $du_i$ with a weighting factor $o_a$ that is a measure of a distance between an operating point defined by the current values of the operating point parameters and the respective operating interpolation point;

linking the weighted changes $du_i$ in the manipulated variables to network responses $d\tilde{y}_j$ according to the equation:

$$d\tilde{y}j = \sum_{a=1}^{s} \sum_{i=1}^{n} w_{aij} \cdot o_a \cdot du_i$$

wherein $w_{aij}$ denotes adjustable network parameters, and $$\sum_{a=1}^{s} o_a \cdot w_{aij} = w_{ij}$$

denotes the actuator efficiencies to be learned; and altering the adjustable network parameters as a function of deviations between the network responses $d\tilde{y}_j$ and the changes in the output quantities so as to reduce the deviations.

9. The method of claim 8, wherein the weighting factor $o_a$ decreases steadily from one to zero at directly adjacent operating interpolation points with an increase in the distance between the operating point and the respective operating interpolation point.

10. The method of claim 1, comprising the step of providing to the neural network as input parameters a plurality of value samples corresponding to the number of manipulated variables, the plurality of value samples each having a value of one at a varying location and a value of zero at other locations, wherein the neural network generates the actuator efficiencies as network responses at an output of the neural network, whereby the learned actuator efficiencies are transferred to the control device.

11. The method of claim 1, wherein:

a profile of rolled stock is regulated in a rolling mill in the process, the output quantities include strip profile characteristics that are distributed over a width of the rolled stock, and the manipulated variables include at least one of a plurality of control actions to alter a roll gap profile.

12. The method of claim 11, wherein the plurality of control actions includes controlling an inclination, a bending, a displacement, a zone cooling, and an eccentricity setting of at least one roll of the rolling mill.

13. A device for controlling a process with a plurality of actuators, the device comprising:

a control device, the control device calculating manipulated variables for the plurality of actuators using measured values of output quantities of the process; and a neural network, the neural network learning actuator efficiencies that describe a dependence of changes in the output quantities on changes in the manipulated variables for each of the plurality of actuators, wherein:

the learned actuator efficiencies learned are provided to the control device to improve the calculation of the manipulated variables, and the neural network has at least two hidden layers, weights of one of the at least two hidden layers modeling current operating point parameters.

14. The device of claim 13, wherein weights of at least a second one of the at least two hidden layers of the neural network are adapted with linear associators.

15. The device according to claim 13, wherein the neural network includes:
- an input layer over which the neural network receives changes $du_i$ in the manipulated variables and operating point parameters of the process, and
- an output layer for supplying network responses $d\tilde{y}_j$, the input layer and the output layer being linked together via network parameters $w_{ij}$, which correspond to the actuator efficiencies to be learned, according to the equation:

$$d\tilde{y}j = \sum_{i=1}^{n} w_{ij} \cdot du_i$$

and wherein the device further comprises:
- a parameter altering device, the parameter altering device operating in accordance with a learning algorithm to alter the network parameters $w_{ij}$ as a function of deviations between the network responses $d\tilde{y}_j$ and the changes in output quantities so as to reduce the deviations.

16. Device according to claim 13, wherein the neural network includes:
- an input layer over which the neural network receives changes $du_i$ in the manipulated variables and operating point parameters of the process,
- an output layer for supplying network responses $d\tilde{y}_j$, and
- a hidden layer arranged between the input and output layers, the hidden layer including:
    - a predetermined number of elements, wherein each element represents one operating interpolation point in a multidimensional space defined by the operating point parameters and wherein each element calculates a weighting factor $o_a$ from the operating point parameters supplied to the element, the weighting factor $o_a$ being a measure of a distance between the operating interpolation point and the operating point defined by the current values of the operating point parameters, and
    - additional elements in which the changes in manipulated variables $du_i$ are weighted individually with the weighting factors $o_a$ supplied by the elements;

wherein the hidden layer and the output layer are linked together via network parameters $w_{aij}$ according to the equation:

$$d\tilde{y}j = \sum_{a=1}^{s}\sum_{i=1}^{n} w_{aij} \cdot o_a \cdot du_i$$

wherein $$\sum_{a=1}^{s} o_a \cdot w_{aij} = w_{ij}$$

denote the actuator efficiencies to be learned, and wherein the device comprises a parameter altering device, the parameter altering device operating in accordance with a learning algorithm to alter the network parameters $w_{ij}$ as a function of deviations between the network responses $d\tilde{y}_j$ and the changes in output quantities so as to reduce the deviations.

* * * * *